United States Patent

[11] 3,597,045

[72] Inventor Einar S. Mathisen
Poughkeepsie, NY

[21] Appl. No. 837,765
[22] Filed June 30, 1969
[45] Patented Aug. 3, 1971

[73] Assignee International Business Machines Corporation
Armonk, N.Y.

[54] AUTOMATIC WAFER IDENTIFICATION SYSTEM AND METHOD
9 Claims, 6 Drawing Figs.

[52] U.S. Cl. .......... 350/162 SF, 250/219 CR, 340/146.3 P, 350/3.5, 356/71
[51] Int. Cl. .......... G02b 27/38
[50] Field of Search .......... 350/162 SF, 3.5; 235/181; 340/146.3; 250/219 CR; 356/71

[56] References Cited

FOREIGN PATENTS 451,571 2/1968 Switzerland .......... 350/3.5

OTHER REFERENCES

Gabor, Nature, Vol. 208, No. 5009, Oct. 1965. pp. 422— 3 (copy in 350/3.5)

Dickinson, Marconi Review, Vol. 30, First Quarter 1967, pp. 40— 48 (copy in 350/162SF)

Goodman, J. W., Introduction to Fourier Optics, McGraw Hill, New York, N.Y. June 25, 1968, pp. 171— 183 (Sci. Lib. Call No. QC355.G6)

*Primary Examiner*—David Schonberg
*Assistant Examiner*—Ronald J. Stern
*Attorneys*—Hanifin and Jancin and Maurice H. Klitzman

ABSTRACT: A method and system for the identification of semiconductor wafers. A code in the form of selected recognition symbols is inscribed in circuit-free regions or kerf areas of the wafer. In a separate operation, complex spatial filters of the entire set of recognition symbols are formed in spaced locations on a photographic medium. To detect whether a particular symbol has been inscribed in the wafer, the symbols within the wafer are cross-correlated with the complex spatial filters on the medium. The matching of a symbol with the complex spatial filter of that symbol produces a recognition spot of light behind the filter. A photodetector associated with each filter detects the light output when a match occurs.

*INVENTOR*

EINAR S. MATHISEN

AUTOMATIC WAFER IDENTIFICATION SYSTEM AND METHOD

BACKGROUND OF THE INVENTION

1. Field of the Invention

This invention relates to the classification and automatic recognition of semiconductor wafers or similar components. The identification is accomplished by a spatial filtering technique.

2. Description of the Prior Art

The semiconductor industry has reached the stage where nearly all of the manufacturing processes are performed automatically. In addition, the number of individual transistors which may be manufactured on a wafer has multiplied in recent years, enabling circuit designers to design numerous different circuits on a wafer. Already, the choice of circuits which may be manufactured in a wafer number in the hundreds. This has caused a need to identify a particular wafer or chip during the manufacturing process and afterwards.

The mutual occurrence of automated manufacturing and the need to identify wafers has stimulated research in automatic identification. The most common means of identification at present is the viewing of letters or numbers inscribed in the wafer by an operator using a microscope. However, this is tedious and necessitates removing the wafer from the process line.

Attempts have also been made at automatic identification. One technique which has been suggested is the etching of predetermined areas in the wafer to form a code. Light is directed at these areas. The radiation reflected from the etched areas is different from the radiation reflected from a nonetched area. This difference is detected by photosensors and provides an electrical indication of the code inscribed in the wafer. Another technique which has been used is the etching of binary or frequency code in the kerf area of the wafer—those unused portions between each unit cell (chip). The code is scanned and detected by an optical sensing system and converted to electrical signals which indicate the code inscribed.

Although these attempts have been successful, the detection equipment required is complicated and expensive. The principal problem involved is the relatively low signal-to-noise ratio between a true output signal and noise from background radiation or signals received from other sections of the wafer which mask the true output. In addition, the code symbols must be accurately placed with respect to one another for accurate detection.

BACKGROUND OF THE INVENTION

Accordingly, an object of this invention is to provide an improved method of identifying wafers which can be integrated into an automated wafer fabrication process.

Another object of this invention is to provide a wafer identification system which yields output signals with a higher signal-to-noise ratio than heretofore possible.

A further object of this invention is to provide a system which is less sensitive to imperfectly inscribed recognition symbols than previous methods.

A still further object of this invention is to provide a wafer identification system which is less sensitive to misplacement of the recognition symbols inscribed in the wafer than previous automatic systems.

Yet, another object is to cross-correlate simultaneously a subset of symbols inscribed within a specimen with complex spatial filters of the set of symbols.

These and other objects are achieved by optically cross-correlating a set of recognition symbols inscribed within the wafer with a photographic medium containing, in spaced locations on the medium, complex spatial filters of the entire set of recognition symbols. A photodetector is associated with each filter to respond to a recognition spot of light. The light appears when a match occurs between a recognition symbol in the wafer and the complex spatial filter of the same symbol on the photographic plate. Briefly, the method is as follows:

A selected set of recognition symbols is inscribed into a predetermined area of the wafer. Preferrably, the symbols are inscribed during the manufacturing process into the circuit-free region of one of the unit cells, called "chips," which comprise the wafer. Alternatively, the symbols may be inscribed into the kerf area between the chips. This set of symbols is the code which will serve to distinguish one wafer from another.

The decoding device of this method is the photographic medium containing spaced complex spatial filters of the entire set of recognition symbols. Each filter is formed in a separate location on the medium by means of an optical system which illuminates a transparency of a selected symbol with beams of coherent light. Each beam is directed to the transparency at different angles. Normally, the number of beams is equal to the number of recognition symbols comprising the set, but may be greater. Each beam passes through and is diffracted by the transparency, to illuminate a separate location on the photographic medium. However, the illumination from all but one beam is masked from the medium, and the diffraction pattern of the transparency illuminates only one selected location on the medium. The diffraction pattern is then transformed into a complex spatial filter by means of an off-axis reference beam which illuminates the medium simultaneously with the diffracted beam. Each location on the medium is exposed to a different recognition symbol. The transparencies are substituted sequentially and a different location on the photographic medium is exposed for each transparency by allowing a different beam to pass through the mask for each transparency.

A readout system serves to cross-correlate the recognition symbols inscribed in the wafer with the complex spatial filters of the symbols. An optical system illuminates the area of the wafer containing the subset of symbols with beams of light from different angles. Each beam is modulated with information representative of the symbols. As above, the number of beams is normally equal to the number of recognition symbols comprising the set. The system then causes each beam to illuminate one of the complex spatial filters on the medium, each beam illuminating a different filter. If a filter matches a symbol in the wafer, a recognition spot of light appears which is detected by a photodetector associated with the filter. The theoretical aspects of cross-correlation using spatial filters are discussed in more detail in "Storage Capacity of an Optically Formed Spatial Filter for Character Recognition" by C. B. Burckhardt, *Applied Optics*, Aug. 1967, and "A Review of Optical Data Processing Techniques" by A. Vander Lugt, *Optica Acta*, Oct. 1968.

The foregoing and other objects, features and advantages of the invention will be apparent from the following, more particular description of the preferred embodiments of the invention as illustrated in the accompanying drawings.

FIG. 1 shows a typical unit cell or "chip" of a semiconductor wafer on which are inscribed recognition symbols.

FIG. 1*a* is a view of the entire semiconductor wafer.

FIG. 2 describes the system for forming complex spatial filters of all recognition symbols on the photographic medium.

Figures 1, 1A, 2:
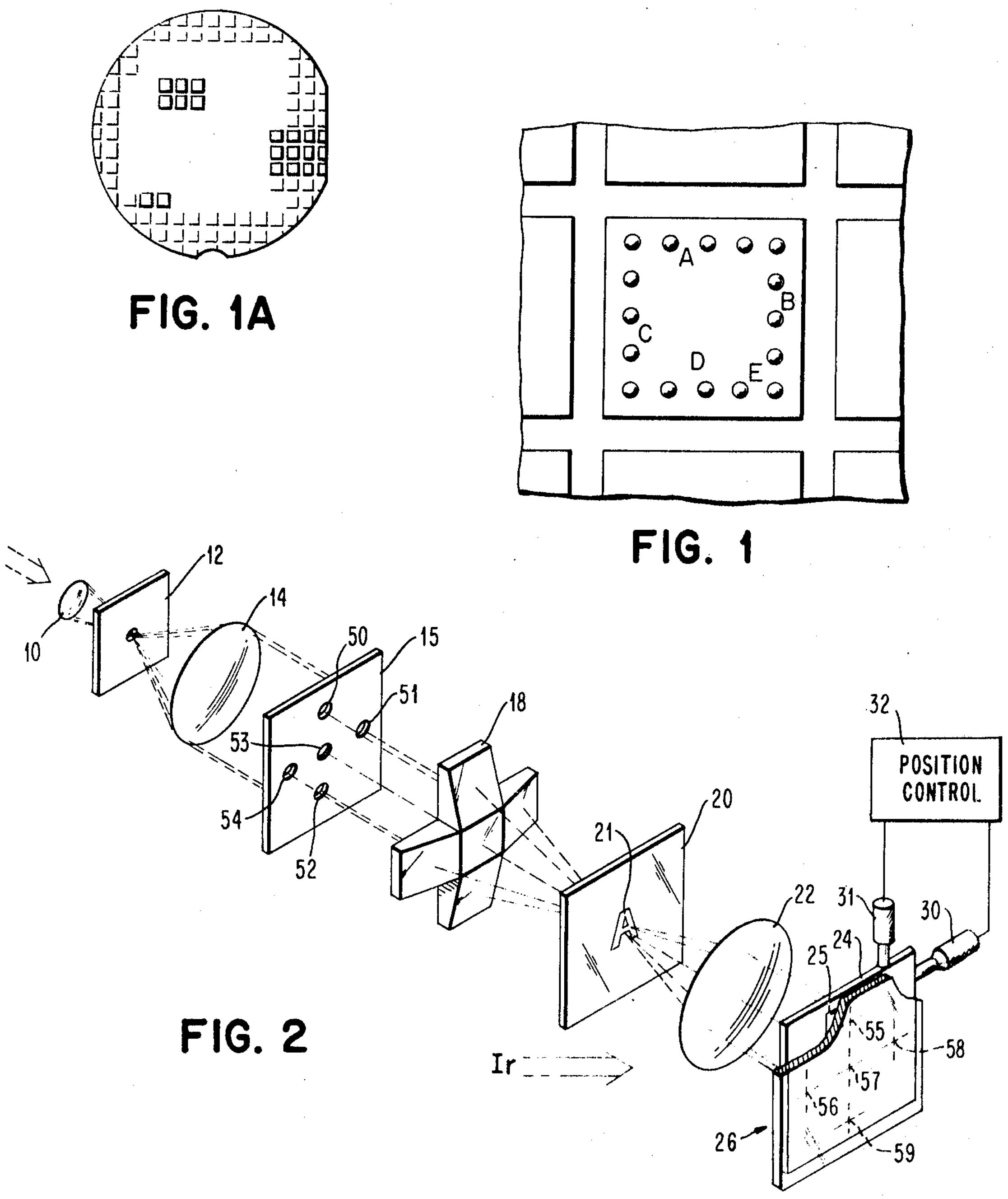

Prior to describing the wafer in Figure 1, it will be helpful to describe a typical semiconductor device which is to be identified and the method by which the recognition symbols are inscribed in the wafer to aid in an understanding of the invention. The technique forms no part of the invention and is well known to those skilled in the art. Semiconductor devices are fabricated from a single crystal silicon wafer which at the present state of the art has a diameter of approximately 1.5 inches and is 0.01 inches thick. More than 1,000 individual transistor or diode devices may be fabricated in the wafer. Typically the wafer is divided into unit cells called "chips" which are approximately 25 mils by 25 mils. Each such unit cell is essentially a duplicate of all other unit cells on the same wafer; however, each wafer may have its own individual electronic characteristics as compared to another wafer, hence, the necessity for being able to identify each wafer.

As is well known to those skilled in the art, the modern-day transistor chip is composed of various layers of semiconductor regions which combine to form one or more transistors. Typically, the chip is composed of substrate of one conductivity type on which is diffused or grown a subcollector region of opposite conductivity type. The collector, base and emitter regions are diffused or grown on the subcollector. It has been found that recognition symbols etched into the wafer by standard techniques can be distinguished from the device pattern of the chip and the pattern which the chips form on the wafer. This may be accomplished by illuminating the top surface of the wafer with light of suitable wavelength which is reflected by the wafer or by transmitting light through the wafer by light of suitable wavelength. In the preferred embodiment to be described, illumination from a He-Ne laser emitting coherent, monochromatic light of wavelength 6328 A will illuminate the surface of the wafer containing the code.

Information as to the shape of the symbols etched into the wafer will be contained in the reflected beam. The symbols will normally be in the form of alphabetical characters, although it will occur to those skilled in the art that many different symbols may be used. The symbols may be etched in any suitable circuit-free region of a chip, or for example in the kerf area of the wafer, which is he unused area between the chips. Again, it will occur to others that the etching might be performed in other areas of the wafer. However, the aforementioned kerf area appears most advantageous because identification may be initiated at a very early stage in the manufacturing process and it has been found that there is less possibility of affecting the transistor characteristics in these areas. Finally, the system and method described is not limited to the identification of wafers, but may be applied in general for detecting the information stored on various types of specimens.

The methods of forming recognition symbols in the wafer are well known to those skilled in the art. One method which has been successful is to etch the symbols into any circuit-free area of any chip in the wafer during the wafer manufacturing process, as for example see FIG. 1. In the typical wafer manufacturing process the subcollector regions are diffused into selected areas of the wafer substrate. This is accomplished by first subjecting the substrate surface to an oxidizing treatment which will produce a layer of substantially silicon dioxide. The oxide may be formed by standard techniques such as evaporation or thermal growth processes, all well known in the art. The oxide is then coated with a photographic resist material such as Kodak photoresist or any one of a number of compositions which are available. Selected sections of the underlying substrate are then exposed by a suitable masking and etching operation whereby the silicon dioxide is removed from the selected portions. The subcollector region is then formed in the substrate by diffusing semiconductor material of opposite conductivity type to the underlying substrate. Following this procedure and before the subcollector region is recoated with another silicon dioxide coating to enable the wafer to be processed further, the recognition symbols may be etched into the circuit-free areas of the chips. This may be accomplished by using well-known photographic projection printing techniques or by contact printing with subsequent etching.

It will be recognized that these identification code marks or symbols may be constructed in various parts of the semiconductor wafer; for instance, as indicated above, one region being the kerf area between the individual chips on the wafer which is not used for fabricating devices.

In another embodiment the recognition symbols may appear in circuit free portions of a chip in a wafer as shown in FIG. 1. The symbols A, B, C, D and E as shown are employed to correspond to a digit of a binary code by virtue of their spatial frequency content providing marked distinction from the frequency content of the circuit pattern. These symbols serve to provide one effective code to identify either a part number or a particular circuit configuration to be formed in each chip or unit cell in the wafer. Thus code digits can be recorded with different frequency content such as the letters A through E. For example the first digit $2^0$, e.g. a 0 or a 1 can be represented by the respective absence or presence of the letter A. Similarly the second digit $2^1$; e.g. 0 or a 2 can be represented by the respective absence or presence of the letter B, etc. In general, subsequent digits $2^2$, $2^3$, $2^4$, etc. are given by the absence or presence of other letters such as C to E. These letters have no particular value except to give each digit position a different spatial frequency content. In fact other letters and even special symbols such as *, 0, ? etc. may be used provided they are not alike and do not bear a resemblance to the spatial frequency content of the circuit pattern. In sum, only the spatial frequency content of the letters and/or symbols is employed to denote a digit in a position of a binary code of one specific embodiment.

For purposes of describing the principle of operation, the following system or code consisting of five digits is employed for giving a part/serial number of from 0 to 31:

| A | B | C | D | E |
|---|---|---|---|---|
| $2^0$ | $2^1$ | $2^2$ | $2^3$ 3 | $2^4$ |

The digit $2^0$ represented by the letter A can be placed in any location on the chip or wafer independent of the location of the other digit positions represented by the letters B through C. Similarly, these other digits $2^1$ through $2^4$ can also be located on the chip or wafer independent of the location of each other. Thus an important advantage of the identification system to be described is that the symbols need not be placed in any particular location on the chip. For example, the letters A and E in FIG. 1 might be switched and the system will still yield the same information as the original positions of the set A through E inscribed on the chip. Additionally, due to an alignment problem in the manufacturing process, the letters might shift somewhat from their expected location within the chip. This will not affect the system's capabilities.

An important feature of this invention is the system for forming the complex spatial filters of the entire set of recognition symbols. The filters are formed in spaced relation on a photographic medium.

Referring to FIG. 2, a source of monochromatic, coherent light 10 is filtered by pinhole 12 to form a point source of light which is one focal length from collimating lens 14. Collimating lens 14 transforms the point source into a parallel beam of light. This beam impinges on stop plate 15 having apertures 50, 51, 52, 53 and 54. Stop plate 15 may consist of any material which is opaque to the light source. The use of a plate with five spaced apertures as shown results in five separate parallel beams of monochromatic, coherent light emanating from stop plate 15. These beams illuminate prism assembly 18, which is constructed to direct the light beams by refraction to an area in a plane along the optical axis. Transparency 20 is mounted in the plane and contains opaque character 21, which is one of the set of recognition symbols. Character 21, shown in FIG. 2 as the letter A, fills the area illuminated by the refracted beams.

The construction of prism assembly 18 will be apparent to those skilled in the art. In this example, it consists of five separate prisms joined into a unit by a standard optical cement. Each prism is designed to refract its associated collimated input beam, directing the beam at a selected angle to the optical axis. In this way, the beams will illuminate transparency 20 at different angles. In this example, the beam emanating from the central aperture remains parallel to the optical axis. The other beams are refracted to different off-axis angles. A discussion of the refractive properties of prisms is given in the book *Fundamentals of Optics*, Jenkins and White, pp. 20—23.

Transparency 20 is located in the front focal plane of lens 22. Lens 22 serves to form an image of each diffracted beam at a separate location on photographic plate 26, which is located in the back focal plane of lens 22. This plate is preferably a high resolution photographic plate such as is supplied by the Eastman Kodak Company of Rochester, New York under the identification Kodak 649F Spectroscopic Plate. Because it is desired to confine the diffraction pattern of character 21 to only one location on plate 26, opaque mask 24 containing aperture 25 is positioned between lens 22 and plate 26 to block off all but a selected one of the beams from plate 26. The mask may be of the same type as mask 15. Mask 24 is movably mounted so that it may be positioned to expose a different location of plate 26 for each of the transparencies. The mask may be moved by hand or its position may be automatically controlled. In FIG. 2, linear actuators 30 and 31 are depicted as the means for moving mask 24 in the X—Y direction. Position control box 32 controls the extension of actuators 30 and 31 in a well-known manner. Although it may not be apparent in the illustration, clearly mask 24 must be sufficiently large to allow aperture 25 to be associated with any single beam while blocking every other beam. It will also be obvious that mask 24 may be positioned at other places along the optical path, as between prism 18 and transparencies 20 to achieve good results.

To form a complex spatial filter of character 21 on plate 26, an off-axis plane reference beam, denoted in FIG. 2 as $I_r$ illuminates the entire plate 26, causing $I_r$ to interfere with the diffracted beam. $I_r$ as employed in this embodiment originates from source 10 and suitably directed to plate 26 by conventional optical techniques. The interference pattern so formed is recorded on location 55 of plate 26, resulting in a record of both the amplitude and phase information of character 21. This is commonly termed a complex spatial filter.

Figure 3:
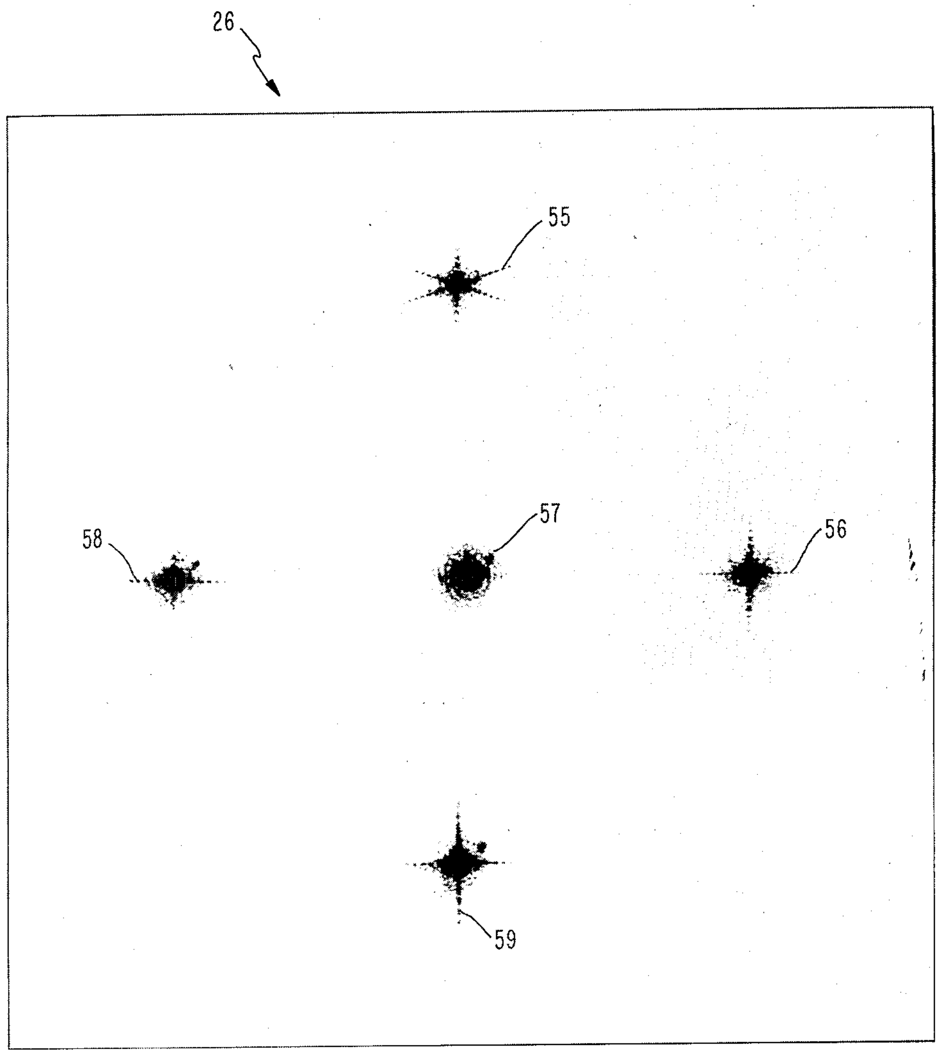
FIG. 3 shows a photographic medium on which have been formed in spaced locations the complex spatial filters of the entire set of recognition symbols.

In operation, the collimating lens 14, stop plate 15 and prism assembly 18 comprise an optical system which first converts a single beam of coherent monochromatic light into a selected number of collimated beams. The optical system then causes the beams to be directed at different angles to a plane area in which is placed a transparency of one recognition symbol. Each beam is diffracted by the symbol and then diverges to illuminate a particular spaced location on the photographic medium. All but one beam is blocked off by a mask so that a single location on the photographic medium is exposed to the energy of a single beam containing information received from the symbol. A complex spatial filter of he symbol is formed in this location by simultaneously illuminating the photographic medium with an off-axis reference beam. Each location on the photographic medium is exposed to a different recognition symbol in like manner by substituting the transparencies in sequence and by exposing each location of the photographic medium with a different diffracted beam. In this example, the beam passing through aperture 25 forms a diffraction pattern of the character 21, the letter A, on location 55 of photographic plate 26. Complex spatial filters of the other recognition symbols B, C, D and E are formed in a similar manner on locations 56, 57, 58 and 59, respectively, of plate 26. This is accomplished by substituting appropriate transparencies one at a time in place of transparency 20 containing the letter A and positioning aperture 25 of mask 24 over the proper locations on plate 26. Finally, the photographic plate is developed in a well-known manner. FIG. 3 shows the finished plate containing the complex spatial filters of the entire set of recognition symbols.

It will be apparent that the recognition symbols are not limited to letters of the alphabet; nor is the number of symbols which may be used limited to five. As a practical matter, the number is not restricted by the complex spatial filter itself, but by the area of the wafer chip which is available for inscribing the symbols. This problem is easily circumvented by inscribing symbols on more than one chip. To increase the number of beams available, a prism assembly containing more prisms will be required.

To insure that the phase relationship between the diffracted and the plane reference beams remains constant in time and space, the coherent light source 10 is ordinarily split into two beams, one of which forms the reference beam $I_r$. This beams-splitting technique is well known to those of ordinary skill in the art and is described further in an article, "How to Make Laser Holograms" by K. S. Pennington in *Microwaves*, Oct. 1965, page 35.

Figure 4:
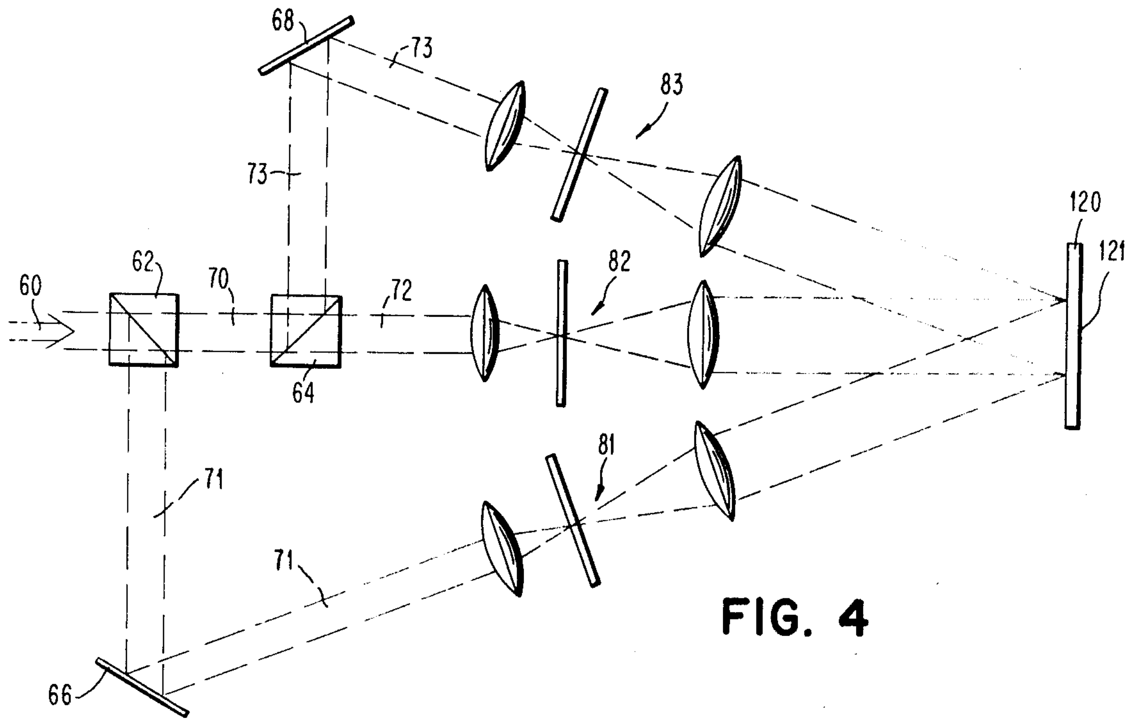
FIG. 4 shows an alternative embodiment of an optical system for transforming a collimated beam of light into a number of collimated beams which are directed to a plane area.

FIG. 4 shows another embodiment of the optical system for forming a plurality of collimated beams directed to a plane area from different angles. This system may be used in place of the stop plate 15, pinhole 12, collimating lens 14, and prism assembly 18 shown in FIG. 2. For simplicity of illustration, only three beams are shown, although in this example five will be required. This system has the disadvantage of requiring more optical components than the preferred system but has the advantage of easier assembly and disassembly. Referring to FIG. 4, a source of monochromatic coherent light 60 is directed to a first beams splitter 62. The beams splitter, which is a half-silvered mirror of a type well known in the art serves to split the beam into two parts 70 and 71. Beam 71 is directed to mirror 66. Beam 70 is directed to a second beam splitter 64 which serves to split beam 70 into two parts 72 and 73. Beam 73 is directed to mirror 68. Mirrors 66 and 68 are positioned to reflect beams 71 and 73 toward a location on the optical axis of source 60. It will be seen that beam 72 is on the optical axis. Beams 71 and 73 are directed toward the optical axis at different off-axis angles to transparency 120, which corresponds to transparency 20 of FIG. . Beams 71, 72 and 73 illuminate lens assemblies 81, 82 and 83, respectively, before proceeding to transparency 120. These lens assemblies perform the function of enlarging beams 71, 72 and 73 to illuminate a selected area of transparency 120 on which the character 121 is inscribed. The design and purpose of the lens assemblies will be well known to those of ordinary skill in the art. Although only three beams have been illustrated, it is obvious that additional beams splitters and mirrors can be used to increase the number to any given quantity. Other ways to convert single source of monochromatic light into a number of collimated beams of light which impinge at different angles to a plane area will occur to those who are familiar with this field.

Having formed complex spatial filters of the entire set of recognition symbols on a photographic plate, it is possible to obtain a speedy and very accurate indication of the identity of the symbols which are inscribed in a wafer. In general, this is performed by cross-correlating the unknown symbols in the wafer with the entire set of symbols which are in the form of complex spatial filters on the photographic plate. Under suitable conditions, which will be described, the cross-correlation will produce a bright spot of light emanating from a filter if the corresponding symbol is inscribed in the wafer. This is commonly termed recognition spot. In the absence of a corresponding symbol in the wafer, a filter will emit virtually no light.

Figure 5:
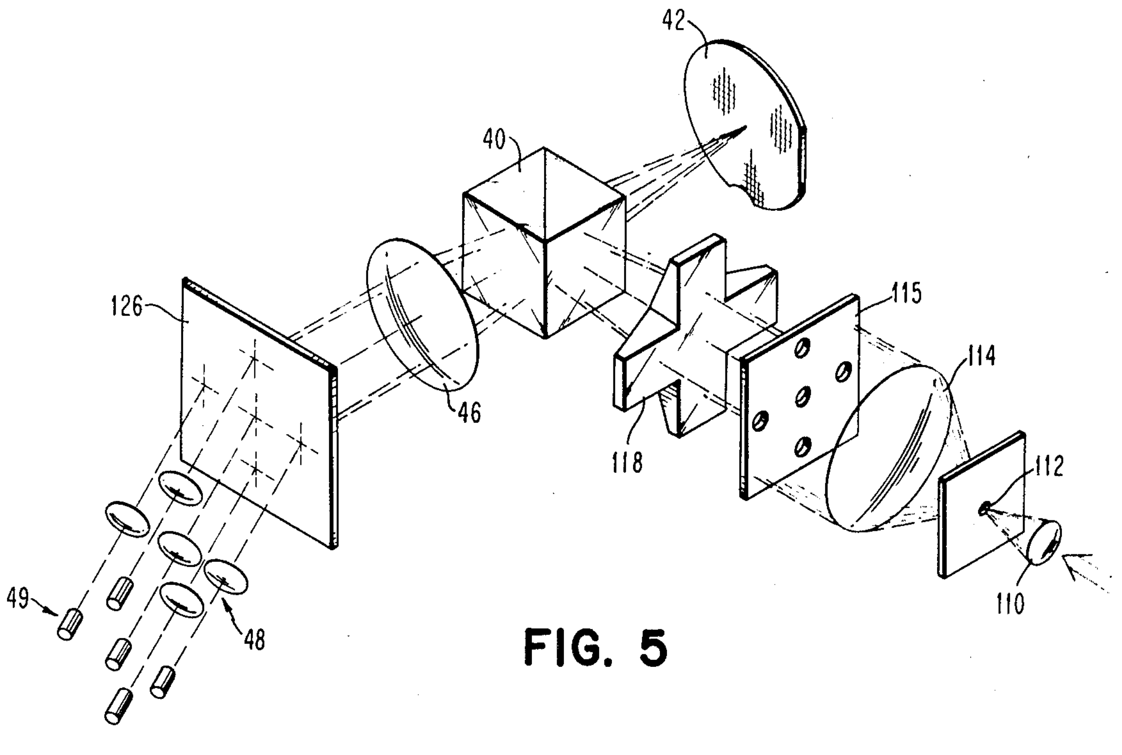
FIG. 5 shows a readout system for cross-correlating the recognition spots inscribed in the wafer with the complex spatial filters of the entire set of recognition symbols.

FIG. 5 illustrates the readout system. As in the system for forming the complex spatial filters, the light from the source is divided into a number of collimated beams which are then caused to converge to a plane area. A source of monochromatic, coherent light 110 is shown which illuminates collimating lens 114 through pinhole 112. The pinhole is one focal length from lens 114, which transforms the point source into a collimated beam of light. This beam impinges on stop plate 115 which has five spaced apertures. This results in five separate parallel beams of monochromatic coherent light emanating from stop plate 115. These beams illuminate prism assembly 118 which refracts the light beams, causing them along the desired paths. It will be apparent that the optical system comprising light source 110, pinhole 112, lens 114, stop plate 115 and prism assembly 118 may be constructed from light source 10, pinhole 12, lens 14, stop plate 15 and prism assembly 18 described in FIG. 2.

The beams refracted by prism assembly 118 are directed to the beam splitter 40. This may consist of a half-silvered mirror of standard design. Beams splitter 40 is arranged to direct the beams reflected therefrom to an area on wafer 42. As described above, selected characters have been inscribed on the wafer, preferably in the circuit-free region or kerf area of a single chip. Each of the coherent light beams illuminates the entire chip or wafer area where the subset of recognition symbols have been inscribed.

Wafer 42 is highly reflective to the light from the coherent, monochromatic source, which may be a He-Ne laser of wavelength 6328 A. The wafer reflects the incident light from beams splitter 40 back to the beam splitter, which allows a portion of each of the divergent beams to illuminate lens 46. At this stage, each beams reflected from the wafer has been modulated by all of the symbols inscribed on the wafer 42 and contains information in the form of diffraction pattern or Fourier Transform about the symbols. An important advantage in this system lies in the fact that the beams need only to be directed at the general area of the wafer containing the symbols. It is important only that each beam be sufficiently wide to illuminate all of the symbols. Of course, less noise is likely to be introduced into the signal if the beam is as narrow as practicable. The amplitude of each of the beams is equal to the sum of the Fourier transforms of the symbols, as is known to those skilled in he art of spatial filtering. Lens 46 performs Fourier transforms on the beams containing information about the unknown symbols inscribed in wafer 42 and forms a diffraction pattern of the beams at complex filter plate 126. Plate 126 corresponds to plate 26 in FIG. 3. It contains the complex spatial filters of the entire set of recognition symbols from which the symbols on the wafer were chosen. Each individual complex spatial filter is located in a separate location on the plate 126. The positioning of the filters which respect to the beams emanating from the lens 46 is important. As explained previously, each beam contains the sum of the Fourier transforms of each character inscribed on the wafer 42. It is important to the operation of this invention that a single beam illuminates a single complex spatial filter on the plate. In this way, each beam, which contains a Fourier transform of the entire unknown set of symbols on the wafer, is cross-correlated with the complex spatial filter of a single character on the plate. In those locations on plate 126 which contain the filter of a character which matches a symbol inscribed on the wafer the light beam refracted from the filter plate will be transformed by lens 48. This results in a bright spot of light which may be detected by one of the photodetectors indicated at the output plane, which is the back focal plane of lens 48. If a filter on plate 126 is not matched by a character on wafer 42, no spot will be produced at that location. For example, assuming that a wafer designated as Part No. 21 is to be identified in binary code 10101, only the letters A, C, and E would be formed on an appropriate portion on the chip and wafer would be processed. Thus on reading out, the filter would only provide spots with the corresponding locations of the letters A, C, and E representing the "1," the $2^0$, $2^2$ and $2^4$ positions of the binary code; and conversely the absence of portions in the B and D positions would represent zeros (e.g. "0") in the $2^1$ and $2^3$ positions of the binary code. The photodetectors indicated at 49 are of a standard variety and may be tied in with a conventional readout control system which can be used to indicate the processing requirements for the wafer based on the identification system of this invention.

Although not illustrated, it is apparent that a readout system could be developed using a source to which the wafer is transparent rather than reflective.

What I claim is:

1. A method of identifying a semiconductor wafer comprising the steps of:

forming spaced complex spatial filters of each one of a set of different recognition symbols on a photographic medium, each filter formed in a separate location of said medium;
developing said photographic medium;
forming selected ones of said symbols in an area of said wafer;
illuminating said area of the wafer with a plurality of monochromatic, coherent beams of light at different angles, thereby modulating said beams with information representative of said recognition symbols;
cross-correlating said modulated beams with the set of complex spatial filters of said symbols;
detecting recognition spots of light formed when a recognition symbol in the wafer matches the complex spatial filter of the symbol.

2. A method according to claim 1 wherein said subset of recognition symbols are formed in circuit-free areas of at least one unit cell of said wafer.

3. A method according to claim 1 wherein said subset of recognition symbols are formed in the kerf area of said wafer.

4. A method according to claim 1 wherein forming spaced complex spatial filters comprises the steps of:
illuminating a transparency of first said symbol with a plurality of beams of light directed at different angles, the beams being diffracted by and diverging from said transparency;
illuminating a first location on said photographic medium with a first one of said diffracted beams;
illuminating said photographic medium with an off-axis plane reference beam to interfere with said diffracted beam, thereby forming a complex spatial filter of said first symbol at said first location on the medium;
forming complex spatial filters at other locations, respectively, by illuminating transparencies of the symbols, respectively, with said diffracted beams, illuminating said other locations with other ones of the beams, respectively, and illuminating said medium with said plane reference beam.

5. A method according to claim 4 wherein all of said diffracted beams except the beam illuminating the photographic medium to form each spatial filter are blocked off from the medium by an opaque mask.

6. A method according to claim 1 wherein the wafer is reflective to said light.

7. A method according to claim 6 wherein illuminating the area of the wafer containing said symbols with said plurality of beams of light comprises the steps of:
transforming a source of monochromatic, coherent light into a collimated beam;
forming said plurality of beams from said collimated beam;
directing said beams to said area of the wafer, thereby causing said beams to reflect and diverge from the wafer.

8. A method according to claim 1 wherein cross-correlating the modulated beams with the set of complex spatial filters comprises the steps of:
performing Fourier transforms on said beams;
illuminating each said complex spatial filter on said medium with one of said beams, a single beam illuminating a single filter.

9. A system for reading out simultaneously a subset of a set of recognition symbols inscribed in a semiconductor wafer, each subset containing more than one symbol comprising:
a source of coherent, monochromatic light reflective to said wafer;
an optical system for converting said light source into a plurality of collimated beams and for directing said beams at different angles to illuminate the portion of the wafer containing all said symbols;
a first lens positioned to receive said beams reflected from said wafer and for forming optical images of said symbols;
a photographic medium positioned on the side of said lens away from the wafer and containing a separate complex spatial filter for each one of the entire set of said recognition symbols, each filter formed in a separate location on said medium, each of said beams from said first lens illuminating said medium, a single beam illuminating a single complex spatial filter for cross-correlating said beams with said filters;

a second lens positioned on the side of said medium away from said first lens for transforming the energy resulting from said cross-correlating to spots of light;

means located at the output plane of said second lens for detecting said spots of light formed when a recognition symbol inscribed in the wafer matches a complex spatial filter of the symbol.